United States Patent [19]
Hansen

[11] Patent Number: 5,443,903
[45] Date of Patent: Aug. 22, 1995

[54] HOT MELT STICK

[75] Inventor: Dennis D. Hansen, Luck, Wis.

[73] Assignee: Minnesota Mining and Manufacturing Company, St. Paul, Minn.

[21] Appl. No.: 23,050

[22] Filed: Feb. 25, 1993

[51] Int. Cl.$^6$ .................... B32B 7/12; B32B 15/04
[52] U.S. Cl. ................... 428/355; 525/902; 428/68; 428/350
[58] Field of Search ............ 428/68, 355, 350; 525/902

[56] References Cited

U.S. PATENT DOCUMENTS

| | | | |
|---|---|---|---|
| 3,317,368 | 5/1967 | Battersby | 161/175 |
| 4,093,485 | 6/1978 | Ornsteen | 156/244.13 |
| 4,457,457 | 7/1984 | Dziki | 222/146 |
| 4,490,424 | 12/1984 | Gerace | 428/68 |
| 4,552,287 | 11/1985 | Dziki | 222/146.5 |
| 4,613,632 | 9/1986 | Aliani et al. | 523/172 |
| 4,621,748 | 11/1986 | Dziki | 222/146.5 |
| 4,774,123 | 9/1988 | Dziki | 428/156 |
| 4,798,878 | 1/1989 | Brinkmann et al. | 528/28 |
| 4,871,590 | 10/1989 | Merz et al. | 427/387 |
| 4,986,680 | 1/1991 | Malendy | 226/127 |

FOREIGN PATENT DOCUMENTS

| | | | |
|---|---|---|---|
| 587700 | 5/1986 | Australia . | |
| 0412867A1 | 2/1991 | European Pat. Off. | B29C 33/62 |
| 0469564A1 | 2/1992 | European Pat. Off. | B29B 13/02 |
| 3518357A1 | 11/1986 | Germany | C09J 3/16 |
| 3-36015 | 2/1991 | Japan | C08J 3/12 |
| 1095735 | 12/1964 | United Kingdom | C08F 29/12 |

*Primary Examiner*—Paul R. Michl
*Assistant Examiner*—LaVonda DeWitt
*Attorney, Agent, or Firm*—Gary L. Griswold; Walter N. Kirn; Steven E. Skolnick

[57] ABSTRACT

A hot melt stick that includes a core of a moisture-curable hot melt composition and a moisture-resistant shell coaxial with the core. The shell includes one or more ethylene-containing copolymers that are compatible with the core upon melting. The hot melt stick is adapted for delivery to the melting chamber of a hot melt applicator.

20 Claims, 2 Drawing Sheets

HOT MELT STICK

BACKGROUND OF THE INVENTION

1. Field of the Invention

This invention relates to hot melt sticks based upon moisture-curable hot melt compositions.

2. Description of Related Art

Moisture-curable hot melt compositions are adhesive, coating, or sealant compositions that are solid at room temperature, but melt at elevated temperatures and then cure in the presence of moisture to produce a crosslinked thermoset resin. Examples of such compositions include isocyanate-terminated polyurethane prepolymers and silyl-terminated prepolymers. The isocyanate or silyl terminal groups react with moisture to produce a cured, thermoset resin. Moisture-curable hot melt compositions are desirable because although they are applied like conventional thermoplastic hot melt compositions, the final cured product exhibits superior properties (e.g., tensile, shear, and peel strength), especially at elevated temperatures.

Due to their moisture sensitivity, it is customary to use complex storage and handling procedures with moisture-curable hot melt compositions. Typically, the composition is stored prior to use in a sealed metal canister under an inert atmosphere. Applicators have been developed which utilize heated platens that are placed into the top opening of the canister to melt the top layer of the moisture-curable hot melt composition for delivery using a pump. These applicators are expensive and utilize a complex sealing arrangement in order to exclude moisture during application. Moreover, it takes time to remove the platen from the canister when it is time to change canisters.

Other applicators have been developed where the entire contents of the canister are heated in order to convert the composition into a suitable form for application. This may be accomplished by transferring the canister to a pre-heater. Following pre-heating, the canister is transferred to the hot melt applicator. Alternatively, the canister may be placed directly in the hot melt applicator and heated there; this process, however, is time-consuming. In contrast, non-moisture sensitive thermoplastic hot melt compositions can be used in "melt on demand" applicators; that is, they are prepared in the form of a stick which is simply supplied to the melting chamber of the applicator without pre-heating or moisture-exclusion for direct application.

Attempts have been made to improve the storage and handling of moisture-curable hot melt compositions. For example, Japanese Patent Application No. 3-36015 describes providing a moisture-curable hot melt composition with a 5-200 micron thick moisture-resistant outer coating to improve shelf life. The hot melt composition and outer coating are co-extruded to form a composite structure in the form of a bead, strand, or pellet. Examples of suitable materials given for the outer coating are polyethylene, polypropylene, polyvinyl chloride, polyvinylidene chloride, paraffin wax, and natural waxes. While the Japanese Patent Application states that in use the core hot melt composition and outer coating can be melted together and applied, it further states that it is preferable to strip the outer coating from the core prior to application. Although the Japanese Patent Application mentions ethylene-containing copolymers such as ethylene/vinyl acetate, ethylene/ethyl acrylate, and ethylene/methyl acrylate copolymers, alone or in combination with tackifying resins, they are suggested for combination with the moisture-curable hot melt composition in the core of the composite, rather than for use as the outer moisture-resistant coating.

European Patent Application No. 0 469 564 A1 describes providing both thermoplastic and thermosetting hot melt compositions with a non-stick thermoplastic envelope that is compatible with the hot melt composition to improve storage and handling; moisture-curable isocyanate-terminated prepolymers are given as an example of a thermosetting composition. A wide variety of thermoplastic resins are suggested for the envelope, including ethylene/vinyl acetate and ethylene/methyl acrylate copolymers. The composites are provided in the form of relatively large pillows or sacks suitable for use in a hopper-fed dispenser.

SUMMARY OF THE INVENTION

In general, the invention features a hot melt stick adapted for delivery to the melting chamber of a hot melt applicator. The hot melt stick includes a core of a moisture-curable hot melt composition and a moisture-resistant shell coaxial with the core. The shell includes one or more ethylene-containing copolymers that are compatible with the core upon melting. By "compatible" it is meant that upon melting the shell does not visibly phase separate from the molten core to form identifiable "islands" of shell material dispersed in the core; such islands are generally undesirable because they may impair the ultimate performance of the core.

The hot melt stick may have a wide variety of cross-sectional shapes; examples include circular, square, and oval shapes. The hot melt stick may also be provided in the form of a toothed rod e.g., as described in Dziki, U.S. Pat. No. 4,774,123 entitled "Thermopolastic Block Shape and Manufacturing Method," hereby incorporated by reference. Deliverability through the hot melt applicator is enhanced if the hot melt stick has a substantially constant cross-section along its length prior to melting (e.g., the cross-sectional dimensions do not vary by more than about 0.05-0.08 cm along the length of the stick prior to melting). Particularly preferred are hot melt sticks in the form of cylindrically shaped rods having a circular cross-section in which the external diameter of the stick (i.e., the diameter of the core plus shell) does not vary by more than about 0.05-0.08 cm along the length of the stick.

The moisture-curable hot melt composition may be an isocyanate-terminated polyurethane prepolymer (i.e., a prepolymer having terminal isocyanate groups prepared by reacting a polyol, e.g., a polyester or polyether-derived polyol, with a multifunctional aliphatic or aromatic isocyanate). Upon exposure to moisture, the prepolymer cures through reaction of the terminal isocyanate groups.

Silyl-terminated prepolymers may also be used as the moisture-curable hot melt composition. Such prepolymers have terminal groups of the general formula $SiX_{3-n}$, where X is a hydroxyl group, a $C_1$–$C_8$ alkoxy group, a $C_1$–$C_8$ acetoxy group, a $C_1$–$C_8$ alkylamino group, a $C_1$–$C_8$ allylamino group, or a $C_1$–$C_8$ oxime group, and n is 0, 1, or 2. As in the case of isocyanate terminal groups, the silyl groups react in the presence of moisture to effect cure.

Another example of a suitable moisture-curable hot melt composition includes compositions containing a prepolymer having urethanesilylurea terminal groups of the general formula or in which $R^1$ is the residue of a monomeric or polymeric diisocyanate; $R^2$ is a $C_{1-4}$ alkyl or alkoxy residue; $R^3$ is a $C_{1-4}$ alkyl residue; $R^4$ is H, a $C_{1-4}$ alkyl group, a phenyl group, or a group having the formula $(CH_2)-Si(R^3)-_p(OR^2)_{3-p}$, y is an integer from 1-4, and p is 0, 1, or 2.

To ensure smooth passage of the hot melt stick through the hot melt applicator, it is important that the hot melt stick not buckle under the pressures exerted during delivery to the melting chamber. To this end, hot melt sticks having a Shore A hardness of at least about 70 prior to melting are preferred.

To maximize final performance, it is desired that both the core and shell material melt at substantially the same temperature such that they mix and form a homogeneous liquid during passage through the hot melt applicator. Mixing is also facilitated when the melt index of the shell is at least 200 g/10 min. (as measured according to ASTM D1238 (modified)).

The identity and amount of the shell material are chosen to protect the moisture-curable prepolymer in the core from premature exposure to moisture (thereby eliminating the need for complex storage equipment currently used with such materials) without impairing the final properties of the hot melt core (e.g., as measured by shear strength). To this end, shell materials having a water vapor transmission of no greater than about 0.08 grams/mil/100 in²/day are preferred. In addition, the amount of shell material preferably is no greater than 8% by weight based upon the combined weight of the shell and the core.

The shell is a moisture-resistant ethylene-containing copolymer (or blend thereof) that is compatible with the core upon melting. The co-monomer typically is a polar co-monomer to maximize compatibility with the core. Examples of suitable copolymers for the shell include ethylene/vinyl acetate copolymer ("EVA"), ethylene/methyl acrylate copolymer ("EMA"), and ethylene/n-butyl acrylate copolymer ("EnBA"). The amount of polar co-monomer segments in the polymer reflects the need to balance compatibility with the core, which is favored by high polar co-monomer content, and mechanical properties, which are favored by low polar co-monomer content (the higher the co-monomer content, the softer and tackier, and thus harder to handle, the hot melt sticks become as they begin to stick or "block" to each other). In the case of ethylene/vinyl acetate copolymers, the amount of vinyl acetate (the polar co-monomer) incorporated in the copolymer is preferably between 14 and 33% by weight. For ethylene/methyl acrylate copolymers, the amount of methyl acrylate (the polar co-monomer) incorporated in the copolymer is preferably between 21 and 24% by weight. In the case of ethylene/n-butyl acrylate copolymers, the amount of n-butyl acrylate (the polar co-monomer) incorporated in the copolymer is preferably between 25 and 40% by weight.

Addition of one or more tackifying resins to the ethylene-containing copolymer improves the moisture resistance of the shell (as measured by the water vapor transmission). Preferably, the amount of tackifying resin is about 130-150 parts per 100 parts of ethylene-containing copolymer. Although a wide variety of tackifying resins are suitable, an aromatic modified aliphatic hydrocarbon tackifying resin having a nominal softening point of about 105° C. is preferred.

The invention provides a melt-on-demand moisture-curable hot melt composition in a convenient stick form for use with hot melt applicators. The hot melt sticks according to the invention are simply loaded into hot melt applicators in the same way as non-moisture curable hot melt sticks. Because moisture resistance is provided in the form of a shell which becomes part of the final composition, the complex and cumbersome metal storage canisters previously used to contain the hot melt composition prior to use, and the waste disposal problems associated with such canisters, are eliminated. Moreover, because the shell is compatible with the core, the final properties of the core are not compromised. The invention thus combines the advantages of moisture-curable hot melt compositions (e.g., good mechanical properties such as shear strength, especially at high temperatures) in an easy-to-use stick form currently found in non-moisture-curable, melt-on-demand, hot melt compositions.

Other features and advantages will be apparent from the following description of the preferred embodiments thereof, and from the claims.

DETAILED DESCRIPTION OF THE PREFERRED EMBODIMENTS

Figure 1:
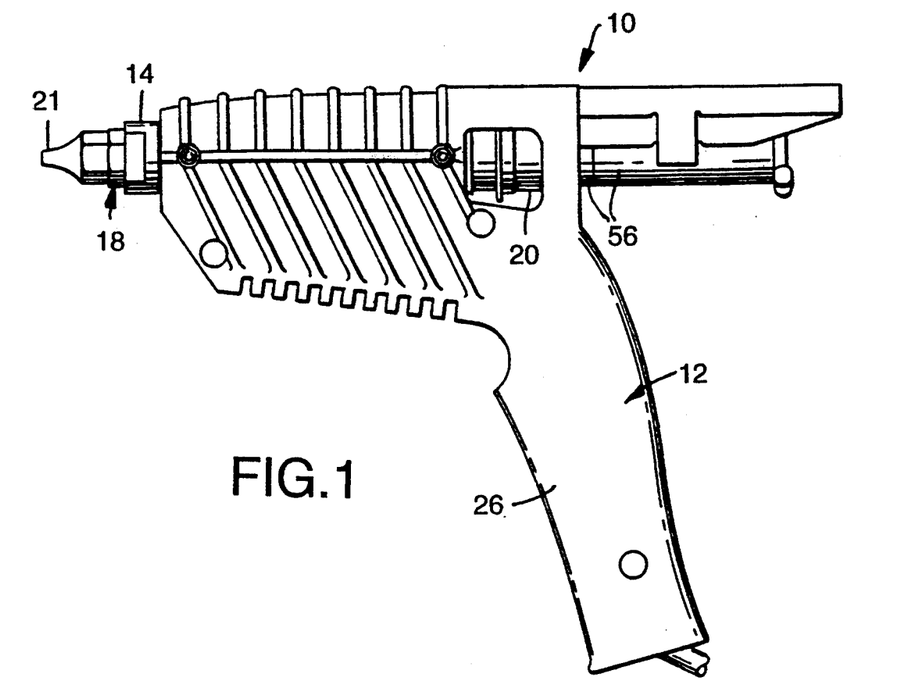
FIG. 1 is a side view of a hot melt applicator described in U.S. Pat. No. 4,552,287 loaded with a hot melt stick according to the invention.
Figure 2:
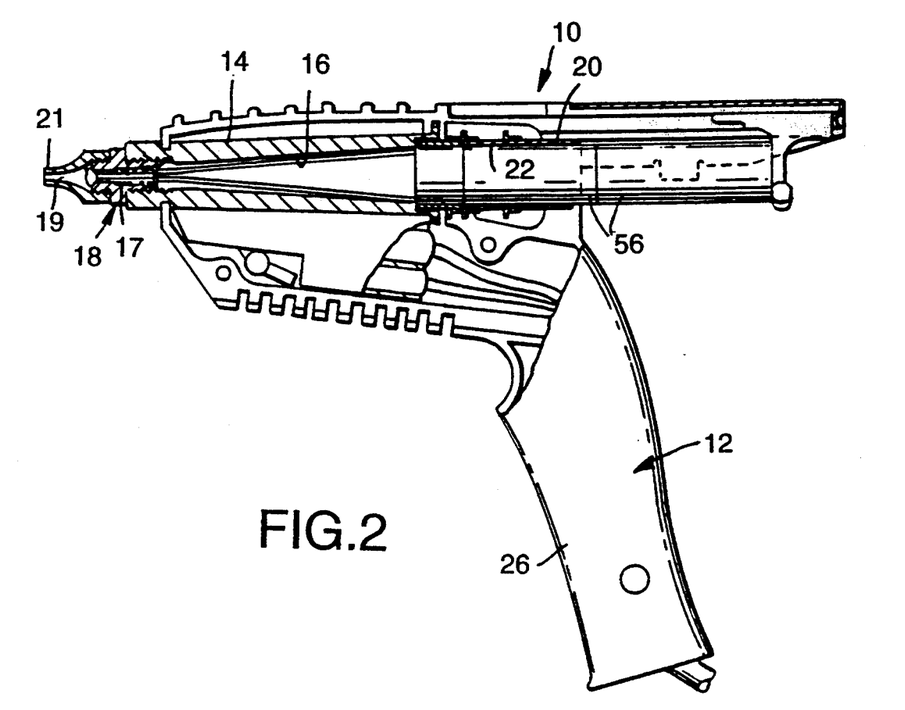
FIG. 2 is a side view of the hot melt applicator of FIG. 1 having parts broken away to show details.

There is shown in FIGS. 1 and 2 a hot melt applicator suitable for dispensing a hot melt stick according to the invention. The applicator, which is generally designated by the reference numeral 10, is described at column 3, line 55 to column 8, line 4 of U.S. Pat. No. 4,552,287, those portions of which are hereby incorporated by reference. It generally features a two part frame 12, a barrel member 14 mounted between the part of the frame 12 and having an internal melting chamber 16 communicating via a discharge passageway 17 through a valve assembly 18 with an outlet opening 19 through a nozzle 21, and a sleeve 20 with a cylindrical through opening 22 having one end secured to the barrel member 14 with its through opening 22 communicating with the end of the melting chamber 16 opposite the discharge passageway 17. The sleeve 20 is adapted to receive a solid hot melt stick 56 within the cylindrical through opening 22 with a slight clearance fit even when the diameter of stick 56 is at the large end of its tolerance range, with one end portion of the stick 56 in the melting chamber 16 and the stick 56 projecting through the opening 22 in the sleeve 20. Means are provided in the applicator 10 for heating the barrel member 14 to melt the end portion of the stick 56 therein. The frame 12 includes a handle 26 positioned so that an operator can grip the handle 26 with the fingers of one hand while applying pressure with the thumb of that hand to press the stick 56 through the sleeve 20 and into the melting chamber 16 and force molten material out of the melting chamber 16 through the valve assembly 18 and nozzle 21.

Figures 3, 4:
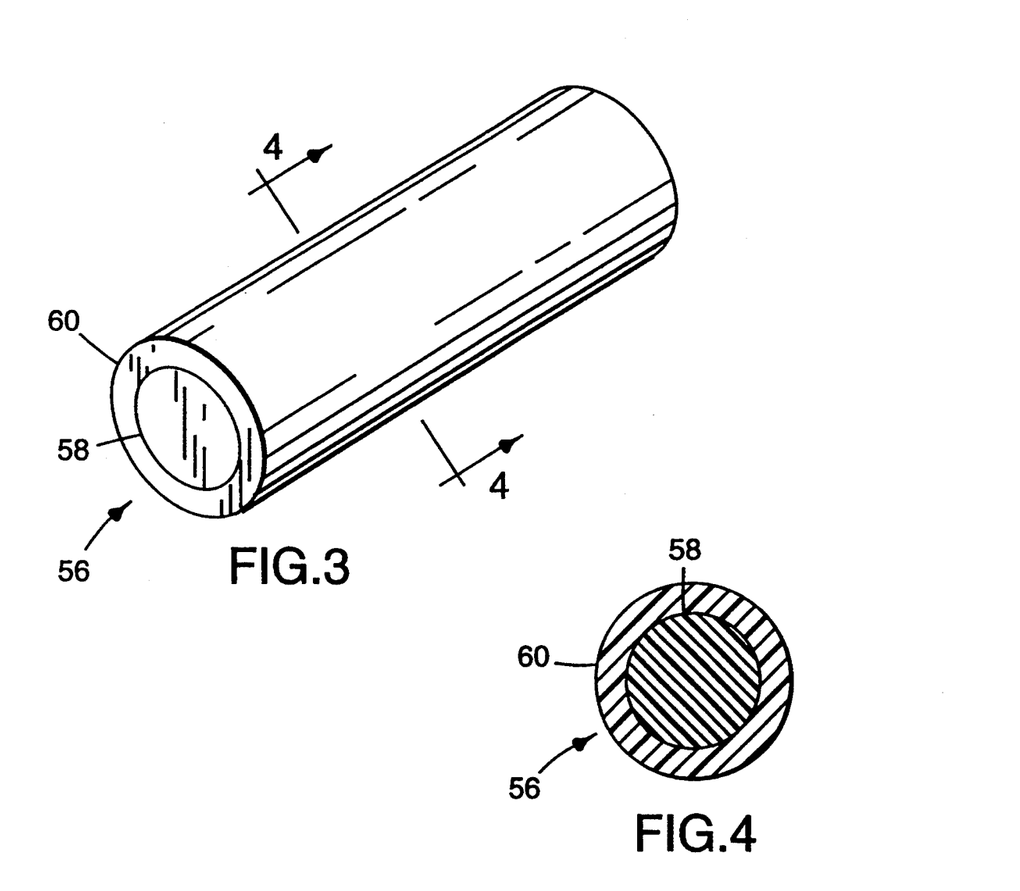
FIG. 3 is a perspective view of a hot melt stick according to the invention enlarged to show detail.
FIG. 4 is a cross-sectional view taken along line 4—4 of the hot melt stick shown in FIG. 3.

Referring to FIGS. 3 and 4, hot melt stick 56, designed to fit into hot melt applicator 10 (FIGS. 1 and 2), features a core 58 of a moisture-curable hot melt composition surrounded by a moisture-resistant shell 60 of an ethylene-containing copolymer. Shell 60 is thick enough to provide moisture resistance but not so thick that upon melting large amounts of shell material become mixed with the core such that final performance is impaired. Preferably, the total amount of shell material is no greater than 8% by weight based upon the combined weight of the shell and the core.

The hot melt stick may contain other layers coaxial with the hot melt core in addition to the shell.

Hot melt stick 56 has a circular cross-section the dimensions of which do not vary by more than about 0.05–0.08 cm along the length of the stick prior to melting. The particular dimensions of the stick are chosen according to the hot melt applicator. If the hot melt stick is too large (i.e., its diameter is too great), it will tend to bind in the inlet sleeve. On the other hand, if it is too small, molten material can flow back around the hot melt stick in use, jamming the applicator and preventing smooth application of the hot melt composition. In general, stick external diameters are on the order of about 1.1 to 2.7 cm. The Shore A hardness of the hot melt stick is also selected to be at least about 70 prior to melting to prevent the hot melt stick from buckling during delivery to the melt chamber of the applicator.

The hot melt stick is preferably prepared by co-extrusion using conventional techniques whereby the core and shell are co-extruded into a cooling medium (e.g., water) to form a rod. These techniques, which are described in Encyclopedia of Polymer Science and Engineering, vol. 6, pp. 608–613, John Wiley & Sons (1986), include multimanifold dies (in which the polymer melt streams are confined to individual flow channels until they are joined near the die-lip exit, shortly before or directly at the primary die land) and the feed block method (in which the melt streams are combined and arranged to flow together in layers moving in laminar flow as they enter the die body). Following extrusion, the rod is chopped to size and its ends sealed using, e.g., wax to exclude moisture from the core prior to use. The hot melt stick can also be prepared by injection molding, blow molding or casting.

The core of the hot melt stick is a moisture-curable hot melt composition that is a solid at room temperature, but which melts and then moisture-cures. One class of suitable hot melt compositions includes isocyanate-terminated polyurethane prepolymers. Examples of such prepolymers include prepolymers prepared by reacting one or more polyols with one or more polyisocyanates. Examples of useful polyols include polyester polyols, polylactam polyols, polyalkylene polyols, polyalkylene ether polyols, polycetal polyols, polyamide polyols, polyesteramide polyols, and polythioether polyols, and blends thereof. The polyols may be blended with monomeric materials so as to incorporate the same directly into the prepolymers. In addition, the polyols may be amorphous (glassy), semi-crystalline, or crystalline.

Examples of useful polyisocyanates can be found in the Encyclopedia of Chemical Technology, Kirk-Othmer, 2nd ed., Vol. 12, pp. 46–47, Interscience Pub., N.Y. (1967), and include aromatic diisocyanates such as diphenylmethane-2,4'-diisocyanate and/or 4,4'-diisocyanate (MDI); tolylene-2,4-diisocyanate and -2,6-diisocyanate (TDI) and mixtures thereof. Other examples include: naphthylene-1,5-diisocyanate; triphenylmethane-4,4', 4"-triisocyanate; phenylene-1,3-diisocyanate and -1,4-diisocyanate; dimethyl-3,3'-biphenylene-4,4'-diisocyanate; diphenylisopropylidine-4,4'-diisocyanate; biphenylene diisocyanate; xylylene-1,3-diisocyanate; and xylylene-1,4-diisocyanate. Examples of useful aliphatic diisocyanate include 1,6-hexamethylene diisocyanate (HDI), trimethylhexamethylene diisocyanate (TMDI), and dicyclohexylmethane-4,4'-diisocyanate. Examples of commercially available hot melt polyurethane prepolymers include the following adhesives, all of which are available from 3M Company, St. Paul, Minn.: Jet-Weld ™ TE-030, TE-031, TE-100, and TS-230 adhesive compositions.

A second class of suitable moisture-curable hot melt compositions includes silyl-terminated prepolymers. Examples of such prepolymers are described in Japanese Patent Application No. 3-36015. These prepolymers feature terminal groups having the general formula $SiX_{3-n}$, where X is a hydroxyl group, a $C_1$–$C_8$ alkoxy group, a $C_1$–$C_8$ acetoxy group, a $C_1$–$C_8$ alkylamino group, a $C_1$–$C_8$ allylamino group, or a $C_1$–$C_8$ oxime group, and n is 0, 1, or 2.

A third class of suitable moisture-curable hot melt compositions includes prepolymers terminated with urethanesilylurea groups. Examples of such prepolymers are described in Huber et al., German Patent No. DE 3518357 A1. The terminal groups have the general formula or in which $R^1$ is the residue of a monomeric or polymeric diisocyanate; $R^2$ is a $C_{1-4}$ alkyl or alkoxy residue; $R^3$ is a $C_{1-4}$ alkyl residue; $R^4$ is H, a $C_{1-4}$ alkyl group, a phenyl group, or a group having the formula $(CH_2)$—$Si(R^3)$-$_p(OR^2)_{3-p}$, y is an integer from 1–4, and p is 0, 1, or 2. The prepolymers may be mixed with an amorphous hydroxy polyester that is a solid at room temperature, has a glass transition temperature of at least 10° C., and has an OH value of 20–60 mg KOH/g.

As stated in the Summary of the Invention, above, the shell is an ethylene-containing copolymer that must protect the moisture-curable core from premature exposure to moisture without impairing the final properties of the core material or the ability to dispense the hot melt stick from a hot melt applicator. A tackifying resin is preferably added to the copolymer to improve moisture resistance. Examples of suitable compositions for the shell (as determined by the selection criteria set forth below) include the following: ethylene/n-butyl acrylate (EnBA) copolymer (preferably having 25–40% by weight n-butyl acrylate); ethylene/vinyl acetate (EVA) copolymer (preferably having 14-33% by weight vinyl acetate); ethylene/methyl acrylate (EMA) copolymer (preferably having 21-24% by weight methyl acrylate); and blends thereof. These copolymers may be used alone or in combination with the following tackifying resins, set forth below.

| Trade Designation | Source | Arom./olef. cont. (mole %) | Nominal Soft. Point (°C.) | Description |
|---|---|---|---|---|
| CLEARON P-85 | Yashukara Yushi* | 2.8 | 85 | hydrog. polyterpene |
| CLEARON P-105 | Yashuhara Yushi | 2.8 | 105 | hydrog. polyterpene |
| CLEARON P-115 | Yashuhara Yushi | 2.8 | 115 | hydrog. polyterpene |
| CLEARON P-125 | Yashuhara Yushi | 2.8 | 125 | hydrog. polyterpene |
| ESCOREZ 5300 | Exxon Chem. Co. | 0 | 105 | hydrog. hydrocarbon |
| ESCOREZ 5320 | Exxon Chem. Co. | NT** | 120 | hydrog. hydrocarbon |
| ESCOREZ 149A | Exxon Chem. Co. | 16 | 105 | arom. mod. aliphatic hydrocarbon |
| ESCOREZ 149B | Exxon Chem. Co. | 16 | 95 | arom. mod. aliphatic hydrocarbon |
| ESCOREZ 165A | Exxon Chem. Co. | 24 | 105 | arom. mod. aliphatic hydrocarbon |
| ESCOREZ 165B | Exxon Chem. Co. | 24 | 95 | arom. mod. aliphatic hydrocarbon |
| FORAL 85 | Hercules Inc. | 6.1 | 85 | hydrog. rosin ester |
| HERCOTAC LA 95 | Hercules Inc. | 42.9 | 93 | arom. hydrocarbon |
| PICCOLYTE HM106 | Hercules Inc. | 40 | 106 | arom. mod. terpene |
| PICCOLYTE HM90 | Hercules Inc. | 25 | 90 | arom. mod. terpene |
| REGALREZ 1094 | Hercules Inc. | 0 | 94 | hydrog. hydrocarbon |
| ARKON M-90 | Arakawa | 15 | 90 | hydrog. arom. hydrocarbon |
| ARKON M135 | Arakawa | 20 | 135 | hydrog. hydrocarbon |

*Yashuhara Yushi Kogyo Co., Ltd.
**Not tested

The following tests are used to select appropriate shell compositions.

The first selection test is based upon blocking ability (i.e., the tendency of a composition to stick to itself). Specifically, the blocking ability of films cast from a prospective shell composition is measured to determine whether the shell composition is too sticky or tacky to be packaged readily. It is preferred (although not essential) that the films exhibit no blocking or only slight blocking. The shell composition (100 parts ethylene-containing copolymer plus 0-150 parts tackifying resin) is added to a pint-sized metal can and heated to 350° F. under nitrogen on a hot plate equipped with a supplemental band heater. After melting, the material is mixed by hand until thoroughly blended (about 1 minute). After mixing, the material is poured onto a TEFLON TM -coated surface and spread into a film using a 10 mil draw down bar. After solidification (about 1 minute), 1.9 cm×12.7 cm strips are cut from the film. Thirty minutes after casting, the strips are folded over on themselves on a TEFLON TM -coated surface and rolled with a 2 kg roller (one pass forward and one pass back). The strips are then immediately separated by hand at a separation rate of about 30.5 cm/sec. Blocking is rated as "blocks" if there is disruption of either film upon separation, "slight" if there is some force needed to pull the films apart but with no disruption of the films, and "none" if the films separated without discernible force or disruption.

The moisture resistance of the shell composition is determined by measuring the water vapor transmission (WVT) of a film prepared from the composition according to ASTM E 96-80 Procedure A (desiccant method) at 23° C. Briefly, a 0.25 mm-0.37 mm thick film of a shell composition is prepared according to the preparation used for the Blocking Test, described above. 10 grams of molecular sieves Type 13X, size 10×20, available from UOP, Des Plaines, Ill., are placed in a container. The shell film is placed over the container, clamped in place with retaining ring, and then sealed with paraffin wax. The assembled container is then weighed to determine its initial weight and weighed at various time intervals thereafter. The difference between the initial and final weights indicates the amount of moisture passing through the film and being absorbed by the molecular sieves for the time elapsed. In general, films having WVT's of no greater than about 0.08 grams/mil/100 in$^2$/day are preferred, although films having higher WVT's can also be used.

Table I reports blocking and WVT data for various shell compositions. The tackifying resin (designated "Resin" in Table I) was ESCOREZ ECR 165A, an aromatic modified aliphatic hydrocarbon having a nominal softening point of 105° C., which is available from Exxon Chemical Co. As shown by the data in Table I, use of a tackifying resin generally improves WVT.

TABLE I

| Copolymer | Resin Per 100 Parts Copolymer | Blocking | WVT (Grams/Mil/ 100 Sq In/Day) |
|---|---|---|---|
| EMA 24%[1] | 0 | SLIGHT | 0.07 |
| | 50 | NOT TESTED | 0.01 |
| | 100 | SLIGHT | 0.01 |
| | 120 | NOT TESTED | 0.01 |
| | 140 | NOT TESTED | 0.01 |
| | 150 | BLOCKS | 0.02 |
| EMA 21%[2] | 0 | NONE | 0.1 |
| | 100 | SLIGHT | 0.01 |
| | 120 | NOT TESTED | 0.01 |
| | 140 | NOT TESTED | 0.01 |
| | 150 | NONE | 0.02 |
| EVA 14%[3] | 0 | NONE | 0.04 |
| | 150 | NONE | 0.02 |
| EVA 33%[4] | 0 | NONE | 0.13 |
| | 150 | NONE | 0.01 |
| EnBA 25%[5] | 0 | NONE | 0.09 |
| | 150 | NONE | 0.06 |
| EnBA 30%[6] | 0 | SLIGHT | 0.13 |
| | 150 | NONE | 0.01 |

[1] ESCOR LDX 326, Ethylene Methyl Acrylate Copolymer ("EMA"), nominal 24% by weight methyl acrylate ("MA") and 1% by weight acrylic acid ("AA") content, Melt Index = 326, available from Exxon Chemical Co.
[2] XS 93.04, Ethylene Methyl Acrylate Copolymer ("EMA"), nominal 21% by weight methyl acrylate ("MA") content, Melt Index = 270, available from Exxon Chemical Co.
[3] ESCORENE 02514, Ethylene Vinyl Acetate ("EVA"), nominal 14% by weight vinyl acetate ("VA"), Melt Index = 2500, available from E. I. Du Pont de Nemours & Co.
[4] EP 4969-IW, Ediylenc Vinyl Acetate ("EVA"), nominal 33% by weight vinyl acetate ("VA"), Melt Index = 400, available from E. I. Du Pont de Nemours & Co.
[5] E-63952-100B, Ethylene n-Butyl Acrylate ("EnBA"), nominal 25% by weight n-Butyl Acrylate ("BA") and 1.5% by weight methacrylic acid ("MAA"), Melt Index = 750, available from E. I. Du Pont de Nemours & Co.
[6] E-63952-100A, Ethylene n-Butyl Acrylate ("EnBA"), nominal 30% by weight n-Butyl Acrylate ("BA"), Melt Index = 750, available from E. I. Du Pont de Nemours & Co.

To determine whether the shell impairs the final properties of the moisture-curable hot melt composition, the shear strength of a composite sample containing a moisture-curable hot melt core composition blended with the shell is tested on various substrates (polycarbonate, polystyrene, acrylonitrile/butadiene/styrene), using the moisture-curable hot melt composition alone as a control. The samples are prepared by adding the moisture-curable composition and 5% by weight of shell material (containing 100 parts ethylene-containing copolymer to 0–200 parts tackifying resin) to a pint-sized metal can and then heating the can to 350° F. under nitrogen on a hot plate equipped with a supplemental band heater. After melting, the material is mixed by hand until thoroughly blended (about 1 minute). After mixing, the material is poured into nitrogen-purged metal canisters for use in a hot melt canister applicator gun.

Next, approximately 0.5 g of the material is extruded onto a first substrate using a Wehrmann ™ KTA 215 hot melt canister applicator, commercially available from Wehrmann, Germany, set at a temperature of about 121° C. A second substrate (made of the same material as the first substrate) is then mated to the first to form a 2.5 cm×2.5 cm overlap area. Two copper wire spacers (0.33 mm diameter) are used to control bondline thickness. The bonded substrates are then aged for 1 week at 25° C., 50% relative humidity, after which the shear strength is measured using an Instron tensile tester at a crosshead speed of 5 cm/min.

Table II reports shear strength data (in psi) for various shell compositions in combination with a moisture-curable hot melt composition. The moisture-curable hot melt composition used to prepare the samples was Jet-Weld ™ TE-031, moisture-curable, isocyanate-terminated, polyurethane prepolymer adhesive, available from 3M Company, St. Paul, Minn. Jet-Weld ™ TE-031 by itself was used as a control. The tackifying resin was ESCOREZ ECR 165A, an aromatic modified aliphatic hydrocarbon having a nominal softening point of 105° C., which is available from Exxon Chemical Co. The substrates were polycarbonate ("PC"), polystyrene ("PS"), and acrylonitrile/butadiene/styrene ("ABS").

As the data in Table II demonstrate, no appreciable decrease in adhesive performance was observed when the moisture-curable hot melt composition was combined with various shell compositions. Although in some cases a slight decrease relative to the hot melt composition control was observed, the material still displayed good adhesive properties.

TABLE II

| Copolymer | Resin Per 100 Parts Copolymer | Substrate PC | PS | ABS |
|---|---|---|---|---|
| EMA 24%[1] | 0 | 1140 | 287 | 602 |
| | 150 | 1104 | 303 | 623 |
| EMA 21%[2] | 0 | 1124 | 306 | 637 |
| | 150 | 1108 | 292 | 638 |
| EVA 14%[3] | 0 | 1062 | 273 | 600 |
| | 150 | 1032 | 298 | 633 |
| EVA 28%[4] | 0 | NA | 295 | 602 |
| | 150 | 1054 | 282 | 610 |
| EVA 33%[5] | 0 | 1103 | 276 | 592 |
| | 150 | 1023 | 282 | 605 |
| ENBA 30%[6] | 0 | 1120 | 297 | 643 |
| | 150 | 1143 | 307 | 620 |
| EnBA 25%[7] | 0 | 1092 | 281 | 621 |
| | 150 | 1103 | 270 | 628 |

TABLE II-continued

| Copolymer | Resin Per 100 Parts Copolymer | Substrate PC | PS | ABS |
|---|---|---|---|---|
| CONTROL | | 1109 | 294 | 580 |

[1] ESCOR LDX 326, Ethylene Methyl Acrylate Copolymer ("EMA"), nominal 24% by weight methyl acrylate ("MA") and 1% by weight acrylic acid ("AA") content, Melt Index = 326, available from Exxon Chemical Co.
[2] XS 93.04, Ethylene Methyl Acrylate Copolymer ("EMA"), nominal 21% by weight methyl acrylate ("MA") content, Melt Index = 270, available from Exxon Chemical Co.
[3] ESCORENE 02514, Ethylene Vinyl Acetate ("EVA"), nominal 14% by weight vinyl acetate ("VA"), Melt Index = 2500, available from E. I. Du Pont de Nemours & Co.
[4] EP 4969-6W, Ethylene Vinyl Acetate ("EVA"), nominal 28% by weight vinyl acetate ("VA"), available from E. I. Du Pont de Nemours & Co.
[5] EP 4969-1W, Ethylene Vinyl Acetate ("EVA"), nominal 33% by weight vinyl acetate ("VA"), Melt Index = 400, available from E. I. Du Pont de Nemours & Co.
[6] E-63952-100B, Ethylene n-Butyl Acrylate ("EnBA"), nominal 25% by weight n-Butyl Acrylate ("BA"), Melt Index = 750, available from E. I. Du Pont de Nemours & Co.
[7] B-63952-100A, Ethylene n-Butyl Acrylate ("EnBA"), nominal 30% by weight n-Butyl Acrylate ("BA"), Melt Index = 750, available from E. I. Du Pont de Nemours & Co.
NA = Not available.

The shear adhesion, bonding range, and set time of extruded rods containing a hot melt core surrounded by shell are also tested to determine whether the shell impairs the final performance of the core material following extrusion. The stability properties of the rod both outside of and in the applicator gun are tested under conditions designed to simulate actual storage and use conditions to determine the effectiveness of the shell. Rods for use in these tests are prepared as follows.

A shell film approximately 0.025 cm thick prepared as described above for the WVT test is used to line a cylindrical metal mold (diameter approximately 2.5 cm) with a slight overlap of the lengthwise edges.

Under nitrogen, using a Wehrmann canister hot melt applicator set at 107° C., a moisture-curing polyurethane adhesive (e.g., Jet-Weld ™ TE-031, available from 3M Company, St. Paul, Minn.) is extruded into the tube formed by the shell film, nearly filling the tube. When cool, the rod thus formed is removed from the mold. A nitrogen atmosphere is used throughout the filling, sealing, and cooling process. A piece of shell film is used to seal the ends of the rod by warming slightly with a heat gun. The rods are then stored under nitrogen in a sealed aluminum pouch that may additionally contain molecular sieves as a moisture scavenger. A control rod containing only core adhesive (e.g., Jet-Weld ™ TE-031) is made in the mold as described above, but without the shell film on the outside or on the ends.

The shear adhesion of the rods thus prepared is tested as follows.

Each rod is extruded from a hot melt applicator at a temperature of about 121° C. onto a first substrate. A second substrate (made of the same material as the first substrate) is then mated to the first to form a 1.3 cm×2.5 cm overlap area. Glass beads (having diameters in the range 1–1.5 mm) are used to control bondline thickness. The bonded substrates are aged for 1 week at 25° C., 50% humidity (RH) and then tested using an Instron tensile tester at a crosshead speed of 5 cm/min.

The bonding range of the rods thus prepared is tested as follows.

Single-ply corrugated cardboard is cut to approximately 33 cm×28 cm, with the natural fold running parallel to one of the 28 cm sides; the fold is located 15 cm from the edge of one of the 28 cm sides. The 15 cm×28 cm portion thus formed is further cut into a series of approximately 6 cm×15 cm flaps. A bead of material (approximately 3 mm in diameter) is extruded from a hot melt applicator at a temperature of about 121° C. onto the cardboard at a distance about 4 cm from the 28 cm uncut side (i.e., the side lacking the flaps). A timer is started immediately after the material has been applied. After a specified amount of time has elapsed, one of the flaps is folded over onto the bead of material and moderate hand pressure is maintained for 2–3 seconds. The flap is then examined for evidence of wet-out of the cardboard surface by the composition. The test is repeated at longer time intervals (using a different flap each time) until the composition no longer wets the cardboard. The longest time after application at which the material still wets the cardboard is designated the "bonding range."

The set time of rods thus prepared is tested as follows.

A 0.5±0.05 g quantity of rod material is extruded at 121° C. onto the center portion of a 2.5 cm×10 cm long×0.8 cm thick piece of Douglas fir; the material is located about 5 cm from each end. After 10 seconds, a second piece of Douglas fir is bonded on its center point and at right angles to the first. Firm hand pressure is used to mate the surfaces and squeeze excess composition from the bondline. At various intervals, a 2.3 kg tensile load is pneumatically applied to the 6.45 cm² bond area. The length of time that is required before the bond can support the 2.3 kg load for at least 120 seconds is then recorded as the "set time."

Extruded rods prepared as described above are aged at elevated temperatures in the melt chamber of a hot melt applicator to test their stability under simulated use conditions as follows (this test is called "gun aging").

A rod is fed into the melt chamber of a hot melt applicator (temperature about 121° C.). The applicator nozzle tip and the loading chamber are sealed against moisture and the applicator is allowed to stand undisturbed with the heat maintained at 121° C. After a specified time interval, material is extruded from the applicator and examined for the presence of gel. No or slight gel indicates that the composition forming the rod is stable at elevated temperature for the time elapsed.

The stability of rods prepared as described above is also tested outside the applicator gun as follows (this test is referred to as "rod aging").

The rods are placed on a tray in a room maintained at (a) 75° C./50% relative humidity and (b) 100° C./100% relative humidity. After a specified time, the rod is placed into a hot melt applicator having a melt chamber maintained at about 121° C., extruded through the applicator, and the extrudate examined for the presence of gel. No or slight gel indicates that the rod composition is stable for the time elapsed.

Tables III and IV report data relating to shear strength, bonding range, set time, and stability ("rod aging" and "gun aging") for the above-described extruded rods prepared using, as the shell, EMA 24% plus 150 parts ESCOREZ ECR 165A tackifying resin. For the shear strength data, the reported values are the average of four tests and have been multiplied by 2 to obtain the results in psi. The test substrates were polystyrene, fiber-reinforced polyester (designated "FRP" in Table III), maple, and acrylic. The rod aging and gun aging data are reported in terms of the amount of time elapsed before gel formation was observed. The designation "NT" means not tested. The data shown in Tables III and IV demonstrate that the final properties of the hot melt composition plus shell (shear strength, bonding range, and set time) prepared in the form of a rod and then extruded, are comparable to those of the hot melt composition alone, whereas the stability behavior is enhanced.

TABLE III

| Copolymer Plus Resin | Shear (pounds per square inch) | | | |
|---|---|---|---|---|
| | STYRENE | FRP | MAPLE | ACRYLIC |
| EMA 24% + 150 parts resin | 579 | 1717 | 1551 | 1443 |
| CONTROL | 570* | 1420* | 1537* | 1312* |

*Composition, in metal canister, was extruded from a Wehrmann canister gun.

TABLE IV

| Copolymer Plus Resin | Bonding Range (Minutes) | Set Time (Seconds) | Rod Aging (75° C./ 50% RH) | Rod Aging (100° C./ 100% RH) | Gun Aging |
|---|---|---|---|---|---|
| EMA 24% + 150 parts resin | 2.5 | 65–75 | 6 Hrs | 2 Hrs | 24 Hrs |
| CONTROL | 2.5* | 60–70* | 15 Min | NT | NT |

*Composition, in metal canister, was extruded from Wehrmann canister gun.
NT = Not tested.

The results shown in Tables I and II demonstrate that in general, compositions with relatively high levels of tackifying resin (specifically, in the range 130–150 parts per 100 parts copolymer) give the best results in terms of blocking ability, WVT, and adhesive performance. The following particular shell compositions were found to be preferred: E-63952-100B ethylene n-butyl acrylate ("EnBA") having 25% by weight n-butyl acrylate ("BA") plus 130–150 parts tackifying resin; XS 93.04 ethylene methyl acrylate copolymer ("EMA") having 21% by weight methyl acrylate ("MA") plus 130–150 parts tackifying resin; and EP 4969-6W ethylene vinyl acetate ("EVA") having 28% by weight vinyl acetate ("VA") plus 130–150 parts tackifying resin. The data in Tables III and IV demonstrate that the final properties of the core plus shell composition (e.g., shear strength, bonding range, and set time) are comparable to those of the hot melt composition without the shell, while the stability behavior is improved.

Various modifications are possible within the scope of the foregoing specification and drawings without departing from the invention which is defined in the accompanying claims.

What is claimed is:

1. A hot melt stick comprising
   a) a core comprising a moisture-curable hot melt composition; and
   b) a moisture-resistant shell coaxial with the core comprising one or more ethylene-containing copolymers that are compatible with the core upon melting, said hot melt stick being adapted for delivery to the melting chamber of a hot melt applicator.

2. The hot melt stick of claim 1 wherein said moisture-curable hot melt composition is selected from the group consisting of isocyanate-terminated polyurethane prepolymers, silyl-terminated prepololymers, and urethanesilylurea group-terminated prepolymers.

3. The hot melt stick of claim 1 wherein the Shore A hardness of said stick prior to melting is at least about 70.

4. The hot melt stick of claim 1 wherein said stick is in the form of a cylindrically shaped rod having a circular cross-section.

5. The hot melt stick of claim 1 wherein said stick has a substantially constant cross-section along its length.

6. The hot melt stick of claim 5 wherein the external diameter of said stick does not vary by more than about 0.05–0.08 cm along the length of said stick.

7. The hot melt stick of claim 1 wherein the water vapor transmission of said shell is no greater than about 0.08 grams/mil/100 in$^2$/day.

8. The hot melt stick of claim 1 wherein the total amount of said shell is no greater than 8% by weight based upon the combined weight of said shell and said core.

9. The hot melt stick of claim 1 wherein said ethylene-containing copolymer comprises ethylene/vinyl acetate copolymer.

10. The hot melt stick of claim 1 wherein said ethylene-containing copolymer comprises ethylene/methyl acrylate copolymer.

11. The hot melt stick of claim 1 wherein said ethylene-containing copolymer comprises ethylene/n-butyl acrylate copolymer.

12. The hot melt stick of claim 1 wherein said shell further comprises a tackifying resin admixed with said ethylene-containing copolymer.

13. The hot melt stick of claim 12 wherein the amount of said tackifying resin is about 130–150 parts per 100 parts of ethylene-containing copolymer.

14. The hot melt stick of claim 12 wherein said tackifying resin comprises an aromatic modified aliphatic hydrocarbon having a nominal softening point of about 105° C.

15. A hot melt stick comprising
   a) a core comprising a moisture-curable isocyanate-terminated polyurethane prepolymer hot melt composition; and
   b) a moisture-resistant shell coaxial with the core comprising
      (i) one or more ethylene-containing copolymers that are compatible with the core upon melting, said copolymers being selected from the group consisting essentially of ethylene/vinyl acetate copolymer, ethylene/methyl acrylate copolymer, and ethylene/n-butyl acrylate copolymer, and
      (ii) a tackifying resin, said hot melt stick being provided in the form of a cylindrically shaped rod having a circular cross-section and a substantially constant diameter along its length that is suitable for delivery to the melting chamber of a hot melt applicator.

16. The hot melt stick of claim 15 wherein the Shore A hardness of said stick prior to melting is at least about 70.

17. The hot melt stick of claim 15 wherein the water vapor transmission of said shell is no greater than about 0.08 grams/mil/100 in$^2$/day.

18. The hot melt stick of claim 15 wherein the total amount of said shell is no greater than 8% by weight based upon the combined weight of said shell and said core.

19. The hot melt stick of claim 15 wherein the amount of said tackifying resin is about 130–150 parts per 100 parts of ethylene-containing copolymer.

20. The hot melt stick of claim 15 wherein said tackifying resin comprises an aromatic modified aliphatic hydrocarbon having a nominal softening point of about 105° C.

* * * * *

UNITED STATES PATENT AND TRADEMARK OFFICE
CERTIFICATE OF CORRECTION

PATENT NO.: 5,443,903

DATED: August 22, 1995

INVENTOR(S): Hansen

It is certified that error appears in the above-identified patent and that said Letters Patent is hereby corrected as shown below:

Column 8, line 63, "EP 4969-1W, Ediylenc" should read --EP 4969-1W, Ethylene--.

Signed and Sealed this

Second Day of July, 1996

Attest:

BRUCE LEHMAN

Attesting Officer     Commissioner of Patents and Trademarks